United States Patent
Nam et al.

(10) Patent No.: US 11,263,126 B2
(45) Date of Patent: Mar. 1, 2022

(54) DATA STORAGE DEVICE AND OPERATING METHOD THEREOF

(71) Applicant: SK hynix Inc., Icheon (KR)

(72) Inventors: Sang Wook Nam, Icheon (KR); Jae Ho Park, Icheon (KR)

(73) Assignee: SK hynix Inc., Icheon (KR)

( * ) Notice: Subject to any disclaimer, the term of this patent is extended or adjusted under 35 U.S.C. 154(b) by 120 days.

(21) Appl. No.: 16/856,912

(22) Filed: Apr. 23, 2020

(65) Prior Publication Data

US 2021/0149796 A1    May 20, 2021

(30) Foreign Application Priority Data

Nov. 19, 2019    (KR) .................. 10-2019-0148385

(51) Int. Cl.
*G06F 12/02*    (2006.01)
*G06F 12/1045*    (2016.01)
*G06F 13/16*    (2006.01)

(52) U.S. Cl.
CPC ...... *G06F 12/0246* (2013.01); *G06F 12/1054* (2013.01); *G06F 12/1063* (2013.01); *G06F 13/1668* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 2006/0233010 A1* | 10/2006 | Li | .................. | G06F 12/0893 365/22 |
| 2010/0287353 A1* | 11/2010 | Khmelnitsky | ...... | G06F 12/0246 711/170 |
| 2013/0080688 A1* | 3/2013 | Park | .................... | G06F 3/0688 711/103 |
| 2014/0281356 A1* | 9/2014 | Buschardt | ............... | G06F 12/10 711/206 |
| 2017/0206029 A1* | 7/2017 | Kazama | .................. | G06F 3/061 |

FOREIGN PATENT DOCUMENTS

KR    1020170091832    8/2017

* cited by examiner

*Primary Examiner* — Yaima Rigol (57) ABSTRACT

A data storage device may include a nonvolatile memory apparatus and a controller. The controller may be configured to translate a logical address into a physical address when receiving a host command (such as a write command or a read command) including the logical address from a host device, to generate a pre-command including the physical address, to transmit the generated pre-command to the nonvolatile memory apparatus before completing one or more remaining operations of the operations used to process the host command, and to transmit a confirm command to the nonvolatile memory apparatus when the remaining operations are complete. The controller may perform the remaining operations and the transmission of the pre-command to the nonvolatile memory apparatus at the same time.

17 Claims, 10 Drawing Sheets

Host Read Case

FIG.4

Host Write Case - 1

FIG.5

Host Write Case - 2

DATA STORAGE DEVICE AND OPERATING METHOD THEREOF

CROSS-REFERENCES TO RELATED APPLICATION

The present application claims priority under 35 U.S.C. § 119(a) to Korean application number 10-2019-0148385, filed on Nov. 19, 2019, in the Korean Intellectual Property Office, which is incorporated herein by reference in its entirety.

BACKGROUND

1. Technical Field

Various embodiments generally relate to a data storage device and an operating method thereof.

2. Related Art

Since a data storage device using a memory device has no mechanical driver, the data storage device has excellent stability and durability, very high information access speed, and low power consumption. Data storage devices having such advantages includes a universal serial bus (USB) memory device, a memory card having various interfaces, a universal flash storage (UFS) device, and a solid state drive (SSD).

In a flash storage device using NAND flash memory, an FTL (Flash Translation Layer) may translate an LPN (Logical Page Number) received from a host into a PPN (Physical Page Number), packetize the PPN with other parameters, and transfer the packetized PPN to a NAND flash controller. Then, the NAND flash controller may perform a scheduling and parsing operation, and then transfer the parsed PPN in the form of an address to the NAND flash memory.

With the gradual improvement in NAND flash I/O speed, the detrimental effect of the time required to provide the NAND command to the NAND flash memory (i.e., the NAND command transmission time) on the performance of flash storage devices is increasing.

SUMMARY

Various embodiments are directed to a data storage device capable of improving data write and read performance by shortening a NAND command transmission time, and an operating method thereof.

In an embodiment, a data storage device may include: a nonvolatile memory apparatus; and a controller configured to: receive a host command including a logical address, determine a physical address corresponding to the logical address, generate a pre-command including the physical address, transmit the generated pre-command to the nonvolatile memory apparatus before completing performance of one or more remaining operations used to process the host command, and transmit a confirm command to the nonvolatile memory apparatus when performance of the remaining operations is complete, wherein the controller performs the remaining operations and the transmission of the generated pre-command to the nonvolatile memory apparatus at the same time.

In an embodiment, an operating method of a data storage device may include the steps of: receiving a host command including a logical address; determining a physical address corresponding to the logical address; generating, according to a specification of the host command, a pre-command which includes the physical address; transmitting the pre-command to the nonvolatile memory apparatus before completing one or more remaining operations used to process the host command; performing the remaining operations; and transmitting a confirm command to the nonvolatile memory apparatus when performing the remaining operations is complete, wherein performance of the remaining operations and transmission of the pre-command to the nonvolatile memory apparatus occur at a same time.

In accordance with the present embodiments, while an FTL operation is performed, a NAND command including some parameters can be transmitted from the point of time that a PPN is decided. Thus, a part of the FTL operation and the NAND command transmission can be performance at the same time. Therefore, the NAND command transmission time can be substantially reduced, which makes it possible to expect that data write or read performance will be able to be improved.

DETAILED DESCRIPTION

Hereinafter, a data storage device and an operating method thereof according to the present disclosure will be described below with reference to the accompanying drawings through exemplary embodiments.

Figure 1:
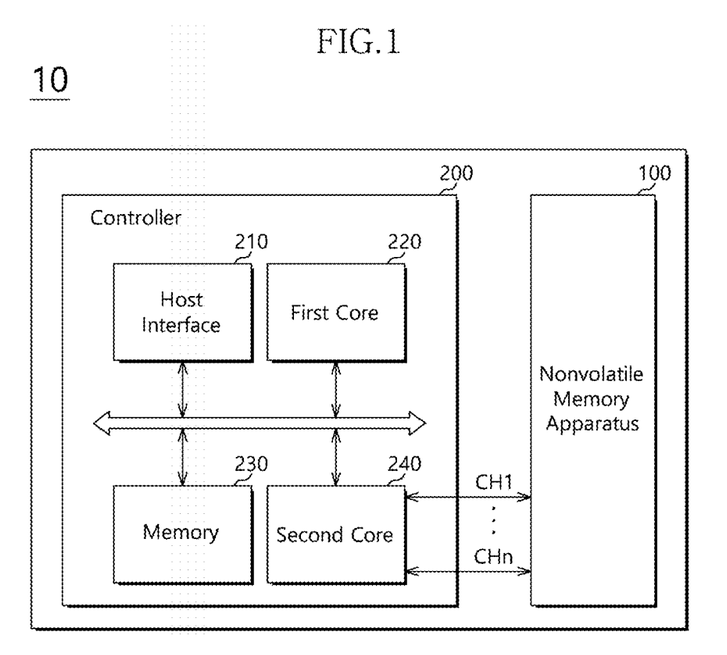
FIG. 1 illustrates a configuration of a data storage device in accordance with an embodiment.

FIG. 1 is a diagram illustrating a configuration of a data storage device 10 in accordance with an embodiment.

Hereafter, the data storage device 10 will be described with reference to FIG. 2 which is a diagram for describing a command transmission procedure in accordance with the present embodiment, FIGS. 3 to 5 which are diagrams for describing a pre-command transmission procedure in accordance with an embodiment, and FIGS. 6 and 7 which are diagrams for describing the command transmission procedure in accordance with the embodiment in more detail.

The data storage device 10 may store data accessed by a host device (not illustrated) such as a mobile phone, MP3 player, laptop computer, desktop computer, game machine, TV or in-vehicle infotainment system. The data storage device 10 may be referred to as a memory system.

The data storage device 10 may be fabricated as any one of various storage devices, according to an interface protocol coupling the data storage device 10 to the host device. For example, the data storage device 10 may be configured as any one of various types of storage devices which include an SSD (Solid State Drive), an MMC (Multi-Media Card) such as an eMMC, RS-MMC or micro-MMC, an SD (Secure Digital) card such as a mini-SD or micro-SD, a USB (Universal Serial Bus) storage device, a UFS (Universal Flash Storage) device, a PCMCIA (Personal Computer Memory Card International Association) card-type storage device, a PCI (Peripheral Component Interconnection) card-type storage device, a PCI-E (PCI Express) card-type storage device, a CF (Compact Flash) card, a smart media card and a memory stick.

The data storage device 10 may be fabricated as any one of various types of packages. For example, the data storage device 10 may be fabricated as any one of various types of packages such as a POP (Package-On-Package), SIP (System-In-Package), SOC (System-On-Chip), MCP (Multi-Chip Package), COB (Chip-On-Board), WFP (Wafer-level Fabricated Package) and WSP (Wafer-level Stack Package).

The data storage device 10 may include a nonvolatile memory apparatus 100 and a controller 200.

The nonvolatile memory apparatus 100 may write or read data to or from an address corresponding to a flash write command or flash read command transmitted from the controller 200. In the present embodiment, each of the flash write command and the flash read command may include a pre-command and a confirm command. The pre-command may include command parameters which can be transmitted before the corresponding confirm command is transmitted, and the confirm command may control the nonvolatile memory apparatus 100 to actually start a write or read operation. The command parameters which can be transmitted before the confirm command may be configured according to an operator's needs, and will be described below in detail.

The nonvolatile memory apparatus 100 may operate as a storage medium of the data storage device 10. The nonvolatile memory apparatus 100 may be configured as any one of various types of nonvolatile memory apparatuses such as a NAND flash memory, NOR flash memory, FRAM (Ferroelectric Random Access Memory) using a ferroelectric capacitor, MRAM (Magnetic Random Access Memory) using a TMR (Tunneling Magneto-Resistive) layer, PRAM (Phase Change Random Access Memory) using chalcogenide alloys, and ReRAM (Resistive Random Access Memory) using transition metal oxide, depending on memory cells.

Figure 14:
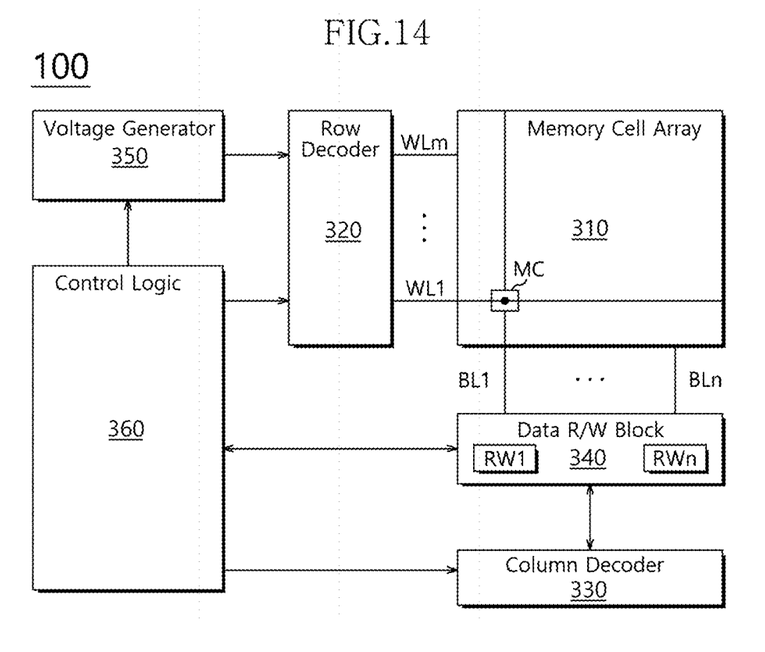
FIG. 14 illustrates a nonvolatile memory apparatus included in a data storage device in accordance with an embodiment.

The nonvolatile memory apparatus 100 may include a memory cell array (not illustrated) having a plurality of memory cells arranged at respective intersections between a plurality of bit lines and a plurality of word lines (as shown in FIG. 14). Each of the memory cells of the memory cell array may be a single level cell (SLC) for storing 1-bit data, a multi-level cell (MLC) for storing 2-bit data, a triple level cell (TLC) for storing 3-bit data, or a quadruple level cell (QLC) for storing 4-bit data. The memory cell array may include one or more of the SLCs, the MLCs, the TLCs and the QLCs. The memory cell array may include memory cells configured in a two-dimensional horizontal structure or memory cells configured in a three-dimensional vertical structure.

The controller 200 may process a read command or write command received from the host (that is, a host command) by performing a plurality of operations. When receiving the host command that includes an LPN (Logical Page Number) from the host device, one of the operations performed by the controller 200 may be translation of the LPN into a PPN (Physical Page Number), with a first set of operations for processing the command being performed before or in parallel with the translation operation, and a second set of operations for processing the command being performed after the translation operation but before the nonvolatile memory apparatus 100 starts the corresponding read or write operation. In an embodiment, after the translation operation determines the PPN, the controller 200 may generate a pre-command including the PPN, and transmit the generated pre-command to the nonvolatile memory apparatus 100. The pre-command may be transmitted before completion of the second set of operations. In an embodiment, processing the host command may include the performance of a third set of operations in response to the nonvolatile memory apparatus 100 completing the corresponding read or write operation.

When the controller 200 finishes performing the remaining operations other than the operations already performed to generate the pre-command (that is, when the controller 200 has completed the second set of operations), the controller 200 may transmit a confirm command to the nonvolatile memory apparatus 100. The pre-command may be a command generated according to the information specified by the read or write command, based on a pre-command packet including command parameters which can be transmitted to the nonvolatile memory apparatus 100 before the confirm command at or after a point of time that a physical address for a logical address transmitted from the host device has been determined. In an embodiment, the controller 200 may determine that the point of time that a command parameter which can be transmitted before the confirm command to the nonvolatile memory apparatus 100 is prepared (for example, the point of time at which a physical address corresponding to the logical address of the host command is determined) is the point of time to transmit the pre-command to the nonvolatile memory apparatus 100.

Figure 3:
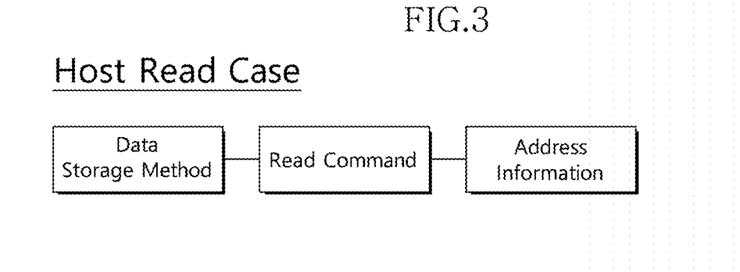
FIGS. 3, 4, and 5 each illustrate a pre-command transmission procedure in accordance with an embodiment.

Referring to FIG. 3, when the host command is a read command, the controller 200 may generate a pre-command packet including a data storage method, a flash read command indication, and address information.

A read operation of the nonvolatile memory apparatus 100 may include both of an array read operation and a data-out operation, and the pre-command packet may be generated even when only a parameter for the array read operation has been determined. Thus, the controller 200 may transmit the pre-command packet to the nonvolatile memory apparatus 100 using only the parameter for the array read operation, and then perform the remaining operations for generating a parameter for the data-out operation. That is, the remaining operations (i.e., the second set of operations) during the read operation may include an operation of generating a parameter for the data-out operation including (for example) buffer allocation. At this time, the remaining operations may also include operations for updating meta information such as a read count.

In general, when the host command is a sequential read command indicating a 128k read, the controller 200 needs to generate 32 unit parameter sets by dividing the read command by 4 k (corresponding to a size of a logical address unit), and set the data-out operation as well as the array read operation for the generated 32 unit parameters. In particular, since the data-out operation requires a read buffer allocation operation, the controller 200 needs to perform the setting operation while repeating the read buffer allocation operation 32 times. That is, a NAND command for a general read operation can be transmitted to the nonvolatile memory apparatus 100, after the parameters for the array read operation and the data-out operation are all generated. In the present embodiment, the controller 200 may transmit only the parameter for the array read operation as the pre-command to the nonvolatile memory apparatus 100 in advance of the transmission of the confirm command. For example, when the host command is a sequential read command indicating 128 k read, the controller 200 may transmit the pre-command to the nonvolatile memory apparatus 100 in advance of the transmission of the confirm command by using only the parameters for the two array read operations that read each of four 16 k planes twice to perform the 128 k read. In the above-described example, the sequential read has been exemplified. However, the present embodiment may also be applied to random read.

Figure 4:
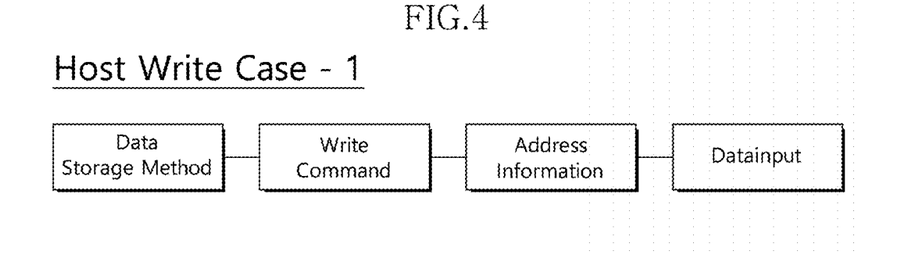

In an embodiment illustrated in FIG. 4, when the host command is a write command, the controller 200 may generate a pre-command packet including a data storage method, a flash write command indication, address information of the nonvolatile memory apparatus, and data to be written.

Figure 5:
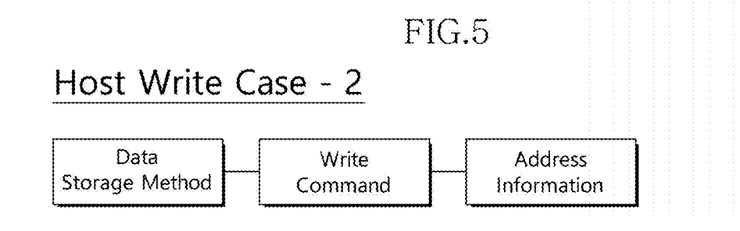

In another embodiment illustrated in FIG. 5, when the host command is a write command, the controller 200 may generate a pre-command packet including a data storage method, a flash write command indication, and address information of the nonvolatile memory apparatus. That is, the pre-command packet for the write command may or may not include user data Datainput to be written, depending on the embodiment.

In the case of the write operation, the remaining operations may include a Logical-to-Physical (L2P) map table update, a journaling data update, and original write data processing. The journaling data update may include an operation that supports data recovery when a situation such as a sudden shut-down occurs.

The original write data processing may include an operation of processing original user data to be written for the sake of protection and security of the original user data.

For example, an original write data processing operation may indicate an operation of scrambling original user data and writing the scrambled data to a new region (i.e. a new region of a buffer) within a memory 230. The scrambling may indicate an operation of processing the original user data through a series of algorithms, according to the characteristics of the nonvolatile memory apparatus (for example, NAND flash) 100. For another example, the scrambling may indicate an operation of encoding the original user data and writing the encoded data to a new region (i.e. a new region of the buffer) within the memory 230. As described above, when the user data is written to the nonvolatile memory apparatus 100, the user data may be not the original data, but the processed data.

When data to be written is included in the pre-command packet, the remaining operations do not include the operation of processing original user data to be written, since that data has already been sent to the nonvolatile memory apparatus 100 at the time when the remaining operations are performed.

Figure 2:
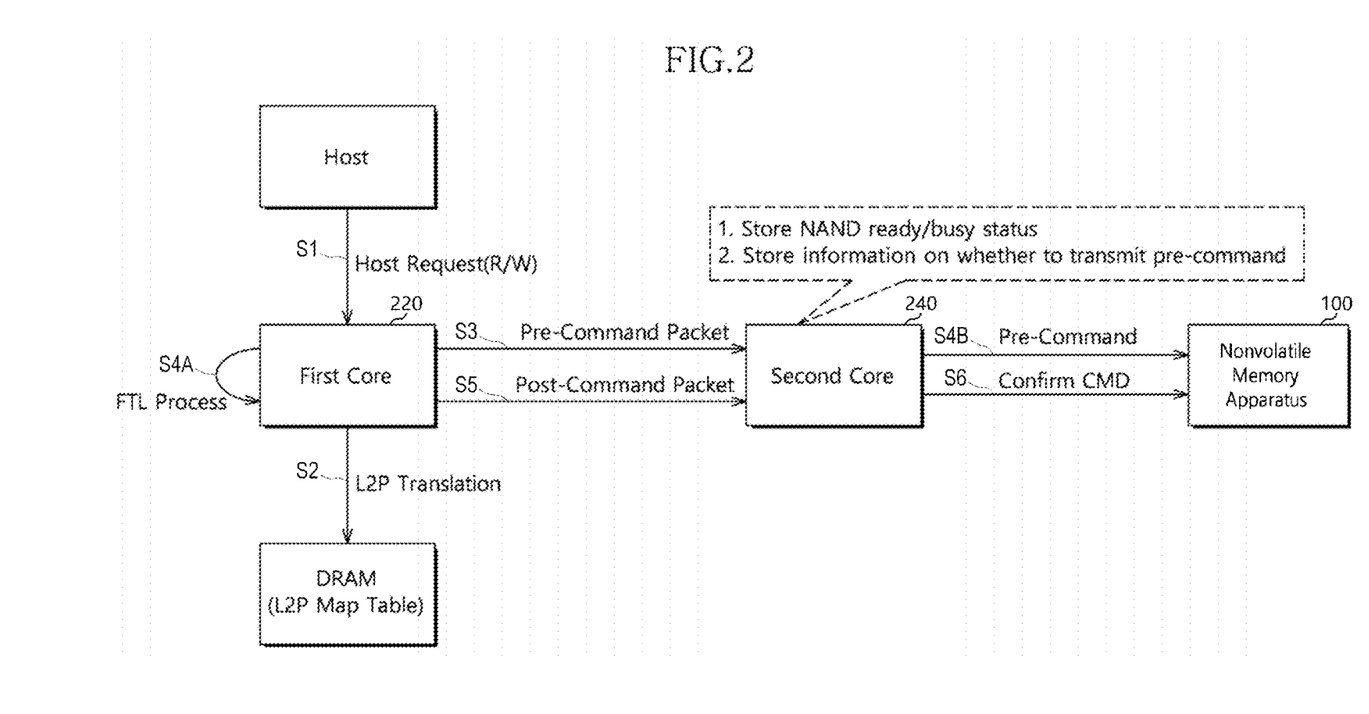
FIG. 2 illustrates a command transmission procedure in accordance with the present embodiment.

As shown in FIG. 2, after receiving the host request (i.e., a host command) including a read or write command (at S1), performing a logical-to-physical (L2P) translation (at S2), and sending the pre-command packet to the second core (at S3), the controller 200 may perform an operation of transmitting the pre-command to the nonvolatile memory apparatus 100 (at S4B) and the remaining operations (such as the FTL process at S4A) which are not involved in generating the pre-command at the same time. In the present embodiment, the controller 200 can process an operation of an FTL core (first core 220 to be described below) and an operation of a NAND core (second core 240 to be described below) in parallel to each other at the same time. After the remaining operations are completed, the first core may send the post-command packet to the second core (at S5), and in response the second core may send the confirm command to the nonvolatile memory apparatus 100 (at S6). Thus, it is possible to expect that the processing speed of the read/write operation may be improved.

The controller 200 may control overall operations of the data storage device 10 by driving firmware or software loaded in the memory 230. The controller 200 may decode and execute a code-based instruction or algorithm such as firmware or software. The controller 200 may be implemented in hardware or a combination of hardware and software.

Referring back to FIG. 1, the controller 200 may include a host interface 210, a first core 220, the memory 230, and a second core 240. Although not illustrated in FIG. 1, the controller 200 may further include an ECC (Error Correction Code) engine which generates parity data by performing ECC encoding on write data provided from a host device and performs ECC decoding on data read from the nonvolatile memory apparatus 100 using the parity data. The ECC engine may be installed inside or outside the second core 240.

The host interface 210 may interface the host device and the data storage device 10 in accordance with a protocol of the host device. For example, the host interface 210 may communicate with the host device through any one protocol of USB (Universal Serial Bus), UFS (Universal Flash Storage), MMC (Multimedia Card), PATA (Parallel Advanced Technology Attachment), SATA (Serial Advanced Technology Attachment), SCSI (Small Computer System Interface), SAS (Serial Attached SCSI), PCI (Peripheral Component Interconnection) and PCI-e (PCI express).

Figure 6:
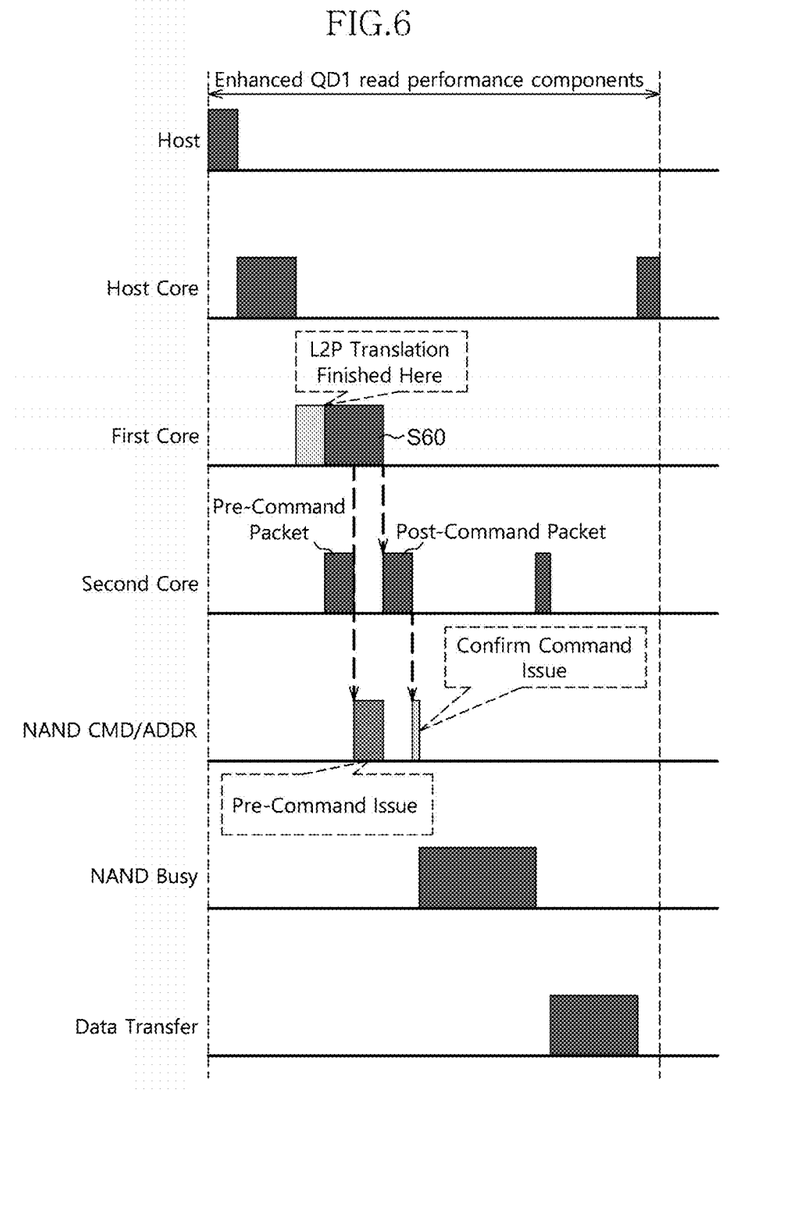
FIGS. 6 and 7 each illustrate a command transmission procedure in accordance with the embodiment.

Referring to FIG. 6, when a read command including a logical address (i.e., an LPN) is received from the host device, the first core 220 may translate the LPN into a PPN, and transfer a pre-command packet including the PPN to the second core 240.

Specifically, when a read command including a logical address (such as an LPN) is received from the host device, the first core 220 may translate the logical address into a physical address (such as a PPN) corresponding to the logical address by referring to an L2P map table previously stored in the controller 200.

When a write command including a logical address is received from the host device, the first core 220 may determine a physical address (such as a PPN) to which data corresponding to the logical address transmitted from the host device is to be written. Determining the physical address may include associating an unused area of memory corresponding to the physical address to the logical address.

The above-described pre-command packet may include command information which can be transmitted to the nonvolatile memory apparatus 100, before the transmission of a confirm command, immediately after the physical address for the logical address transmitted from the host device has been determined (such as the time indicated by "L2P Translation Finished Here" in FIG. 6).

For example, the pre-command packet may include a data storage method (e.g., reliability mode, such as SLC, TLC or MLC), a flash write/read command indication, and address information. Accordingly, when a read command is received from the host device, the pre-command packet may include the data storage method (e.g., the reliability mode), a channel, a chip enable CE, a NAND row address, a NAND column address, and the flash read command indication. For example, in the case of SLC 1-Plane Read Operation, the pre-command may be configured in a format such as DAh-00h-CCRRR. Here, DAh may represent the data storage method, 00h may represent the flash read command indication, and CCRRR may represent the address information, where CC is a column address portion and RRR is a row address portion. As another example, in the case of 4-Plane Read Operation, the pre-command may be configured in a format such as 00h CCRRR 31h-00h CCRRR 31h-00h CCRRR 31h-00h CCRRR. Here, 00h may represent the flash read command indication, CCRRR may represent the address information, and 31h may represent a plane change command.

When a write command is received from the host device, a pre-command packet may include a data storage method (e.g., a reliability mode, such as SLC, TLC or MLC), a channel, a chip enable CE, a NAND row address, a NAND column address, a buffer address, a flash write command indication and data to be written. The data to be written may indicate user data. For example, in the case of SLC 1-Plane Write Operation with DataIn, the pre-command may be configured in a format such as DAh-80h-CCRRR-DataInput. Here, DAh may represent a data storage method, 80h may represent the flash write command indication, CCRRR may represent the address information, and DataInput may represent the data to be written.

In another example, in the case of 4-Plane Write Operation with DataIn, the pre-command may be configured in a format such as 80h CCRRR DataIn1 11h-80h CCRRR DataIn2 11h-80h CCRRR DataIn3 11h-80h CCRRR DataIn4. Here, 80h may represent the flash write command indication, CCRRR may represent the address information, DataIn1 to DataIn4 may represent the portions of the data DataIn to be written into the first to fourth planes, respectively, and 11h may represent a plane change command.

On the other hand, when a write command is received from the host device, a pre-command packet may include the data storage method (reliable mode) such as SLC, TLC or MLC, a channel, a chip enable CE, a NAND row address, a NAND column address, a buffer address, and the flash write command indication. That is, the data to be written may not be included in the pre-command. The present embodiment is not limited thereto, but the parameters included in the pre-command packet can be changed depending on an operator's necessity. In the case of SLC 1-Plane Write Operation without DataIn, the pre-command may be configured in a format such as DAh-80h-CCRRR. Here, DAh may represent the data storage method, 80h may represent the flash write command indication, and CCRRR may represent the address information.

The first core 220 may transfer the pre-command packet to the second core 240, and perform the remaining operations which do not include those operation used to generate the pre-command packet (operation S60 of FIG. 6). That is, the first core 220 may perform the remaining operations such as packetizing, which is related to the read/write command.

When finished with the remaining operations, the first core 220 may transmit a post-command packet of FIG. 6 to the second core 240 indicating that the second core 240 is to transmit a confirm command. The nonvolatile memory apparatus 100 may start to perform the flash read or write command after receiving the confirm command from the second core 240.

In an embodiment, when the first core 220 receives a host abort command from the host device before transmitting the post-command packet to the second core 240, the first core 220 may abort the procedure of transmitting the post-command packet to the second core 240. In other words, in response to receiving the host abort command, the first core 220 may direct to the second core 240 to not transmit the confirm command. As a result, the nonvolatile memory apparatus 100 may not perform the operation corresponding to the pre-command which it had received.

In another embodiment, when the first core 220 receives the host abort command from the host device before transmitting the post-command packet to the second core 240, the first core 220 may transmit a post-command packet including an abort request to the second core 240. In response to receiving the post-command packet including the abort request, the second core 240 may abort transmitting the pre-command to the nonvolatile memory apparatus 100. When the second core 240 receives the post-command packet including the abort request after completely transmitting the pre-command to the nonvolatile memory apparatus 100, the second core 240 may not perform a separate operation on the nonvolatile memory apparatus 100.

The above-described first core 220 may process the request transmitted from the host device. In order to process the request transmitted from the host device, the first core 220 may execute a code-based instruction or algorithm, i.e. firmware, which is loaded into the memory 230, and control the operations of the nonvolatile memory apparatus 100 and internal devices such as the host interface 210, the memory 230 and the second core 240.

The first core 220 may generate control signals for controlling an operation of the nonvolatile memory apparatus 100, based on requests transmitted from the host device, and provide the generated control signals to the nonvolatile memory apparatus 100 through the second core 240.

The memory 230 may store the L2P map table including a logical address and a physical address corresponding to the logical address.

The above-described memory 230 may include a dynamic RAM (DRAM) or static RAM (SRAM). The memory 230 may store the firmware performed by the first core 220. Furthermore, the memory 230 may store data required for performing the firmware, for example, metadata. That is, the memory 230 may operate as a working memory of the first core 220. Although not illustrated in FIG. 1, the controller 200 may further include a first core-dedicated memory disposed adjacent to the first core 220, and the firmware and meta data stored in the memory 230 may be loaded to the first core-dedicated memory.

The memory 230 may include a data buffer for temporarily storing write data which will be transmitted from the host device to the nonvolatile memory apparatus 100, read data which are read from the nonvolatile memory apparatus 100 and will be transmitted to the host device, or both. That is, the memory 230 may operate as a buffer memory.

FIG. 1 illustrates that the memory 230 is included in the controller 200, but the memory 230 may be outside the controller 200.

The second core 240 may transmit a pre-command, which is generated according to the specification of a write or read command based on a pre-command packet, to the nonvolatile memory apparatus 100. Then, after the remaining operations are finished, the second core 240 may generate a confirm command based on a post-command packet transferred from the first core 220, and transmit the confirm command to the nonvolatile memory apparatus 100.

The second core 240 may store information on a ready status or busy status of the nonvolatile memory apparatus 100, and transmit a pre-command or confirm command when the nonvolatile memory apparatus 100 is in the ready status. When the nonvolatile memory apparatus 100 is in the busy status, the second core 240 may wait without transmitting the pre-command or the confirm command to the nonvolatile memory apparatus 100.

The second core 240 may manage transmission statuses including transmission start, transmission finish, and transmission preparation for the pre-command which is to be transmitted to the nonvolatile memory apparatus 100.

The second core 240 may manage the transmission statuses for the pre-command as follows. When the second core 240 starts to transmit the pre-command to the nonvolatile memory apparatus 100, the transmission status may be set to the transmission start. When the second core 240 finishes transmitting the pre-command to the nonvolatile memory apparatus 100, the transmission status may be set to the transmission finish. Before the second core 240 transmits the pre-command to the nonvolatile memory apparatus 100, the transmission status may be set to the transmission preparation.

Before transmitting the confirm command to the nonvolatile memory apparatus 100, the second core 240 may check whether the pre-command has been transmitted, based on the transmission status. Then, when transmitting the confirm command, the second core 240 may determine whether to transmit the pre-command, that is, whether the pre-command corresponding to the confirm command has not been transmitted yet. When the transmission status of the pre-command is the transmission preparation, the second core 240 may transmit the confirm command with the pre-command.

Figure 7:
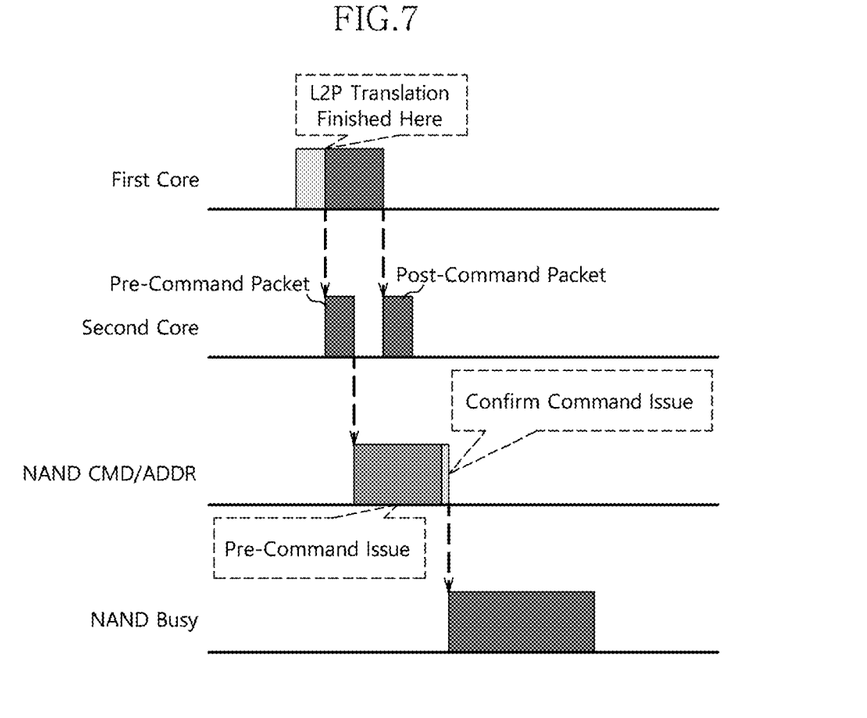

Referring to FIG. 7, when receiving a post-command packet from the first core 220 while transmitting the pre-command to the nonvolatile memory apparatus 100, the second core 240 may transmit the confirm command (indicated in FIGS. 6 and 7 by "Confirm Command Issue") to the nonvolatile memory apparatus 100 after waiting for the transmission of the pre-command (indicated in FIGS. 6 and 7 by "Pre-Command Issue") to be completed.

Accordingly, as shown in FIG. 7, at the time the second core 240 receives the post-command packet, the second core 240 may check the transmission status of the pre-command, and determine whether the pre-command is being transmitted to the nonvolatile memory apparatus 100.

The second core 240 may control the nonvolatile memory apparatus 100 under control of the first core 220. When the nonvolatile memory apparatus 100 is configured as a NAND flash memory, the second core 240 may be referred to as an FCT (Flash Control Top). The second core 240 may transmit control signals, generated by the first core 220, to the nonvolatile memory apparatus 100. The control signals may include a command, an address and an operation control signal for controlling an operation of the nonvolatile memory apparatus 100. Examples of the operation control signal may include a chip enable signal, a command latch enable signal, an address latch enable signal, a write enable signal, a read enable signal, a data strobe signal, and the like, but are not limited thereto. The second core 240 may transmit write data to the nonvolatile memory apparatus 100, and may receive read data from the nonvolatile memory apparatus 100.

The second core 240 and the nonvolatile memory apparatus 100 may be coupled through a plurality of channels CH1 to CHn. The second core 240 may transmit signals, such as a command, an address, an operation control signal and data (i.e. write data), to the nonvolatile memory apparatus 100 through the plurality of channels CH1 to CHn. The second core 240 may receive a status signal (for example, ready/busy) and data (i.e. read data) from the nonvolatile memory apparatus 100 through the plurality of channels CH1 to CHn.

Figure 8:
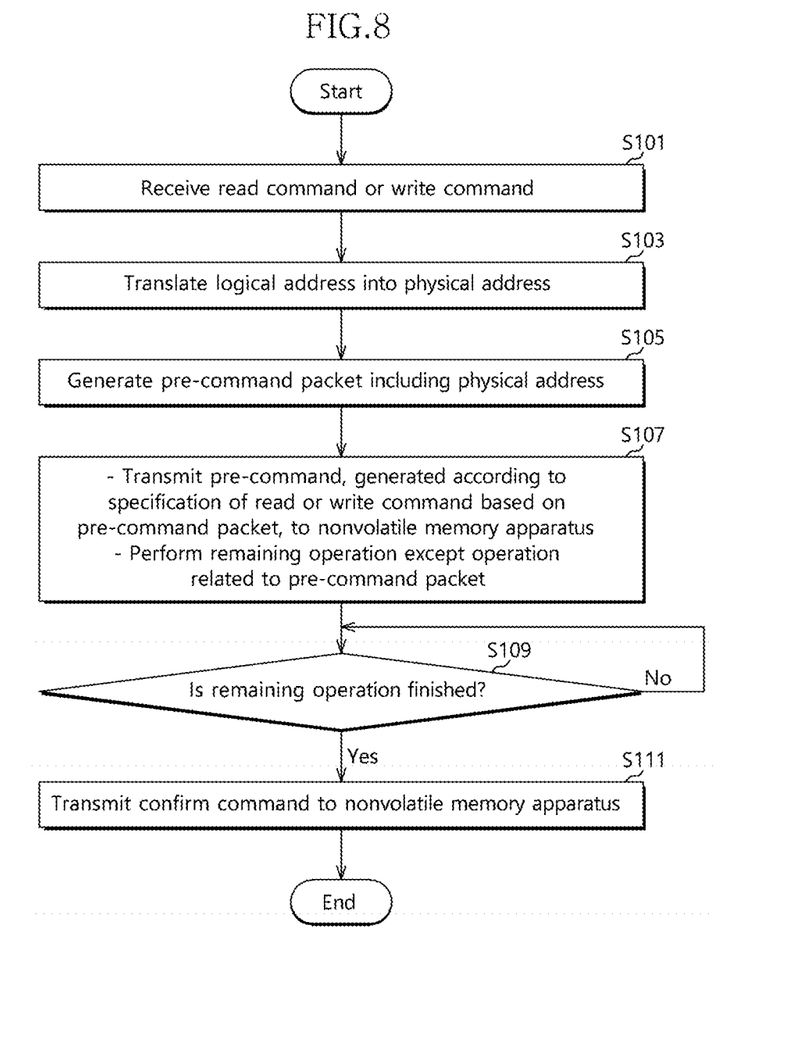
FIG. 8 is a flowchart describing an operating process of a data storage device in accordance with an embodiment.

FIG. 8 is a flowchart illustrating an operating process of a data storage device in accordance with an embodiment.

In step S101, the controller 200 may receive a host command (which may be a write command or a read command) including a logical address from the host device.

In step S103, the controller 200 may translate the logical address into a physical address corresponding to the logical address.

Specifically, when receiving a read command including a logical address from the host device in step S101, the controller 200 may translate the logical address, included in the read command received from the host device, into a physical address corresponding to the logical address by referring to a previously-stored L2P map table.

When receiving a write command including a logical address from the host device in step S101, the controller 200 may determine a physical address to which data corresponding to the logical address received from the host device is to be written.

In step S105, the controller 200 may generate a pre-command packet which includes the physical address and can be transmitted to the nonvolatile memory apparatus 100 before the remaining operations involved in processing the command received from the host (i.e., the operations not performed when producing the pre-command packet) are completed.

Referring to FIG. 3, when receiving a read command from the host device, the controller 200 may generate a pre-command packet including a data storage method, a flash read command indication, and address information.

Referring to FIG. 4, in an embodiment, when receiving a write command from the host device, the controller 200 may generate a pre-command packet including a data storage method, the flash write command indication, address information, and data to be written.

Referring to FIG. 5, in another embodiment, when receiving a write command from the host device, the controller 200 may generate a pre-command packet including a data storage method, a flash write command indication, and address information.

In step S107, the controller 200 may transmit the pre-command, which was generated according to the specification of the write or read command based on the pre-command packet, to the nonvolatile memory apparatus 100.

In step S107, the controller 200 may also perform the remaining operations (operations needed to process the command from the host but not used to generate the pre-command).

The operation of transmitting the pre-command to the nonvolatile memory apparatus 100 and performing the remaining operations in step S107 may be performed at the same time.

In step S109, the controller determines whether the remaining operations are completed, and waits at S109 until they are. Then, when it is determined that the remaining operations are completed, at S111 the controller 200 may transmit a confirm command to the nonvolatile memory apparatus 100.

In steps S107 and S111, when the nonvolatile memory apparatus 100 is in the ready state, the controller 200 may transmit the pre-command (for step S107) or the confirm command (for step S111) to the nonvolatile memory apparatus 100.

Although not illustrated, the controller 200 may manage transmission statuses including transmission start, transmission finish, and transmission preparation for the pre-command which is to be transmitted to the nonvolatile memory apparatus 100.

Before transmitting the confirm command to the nonvolatile memory apparatus 100, the controller 200 may check whether the pre-command has been transmitted, based on the transmission status. Then, when transmitting the confirm command, the controller may determine whether to also transmit the pre-command. When the transmission status of the pre-command is the transmission preparation, the controller 200 may transmit the confirm command with the pre-command.

When a post-command packet is generated according to the completion of the remaining operations while the pre-command is being transmitted to the nonvolatile memory apparatus 100, between step S107 of transmitting the pre-command to the nonvolatile memory apparatus 100 and step S111 of transmitting the confirm command to the nonvolatile memory apparatus 100, the controller 200 may wait until the pre-command is completely transmitted, and then transmit the confirm command to the nonvolatile memory apparatus 100 (see FIG. 7).

Figure 9:
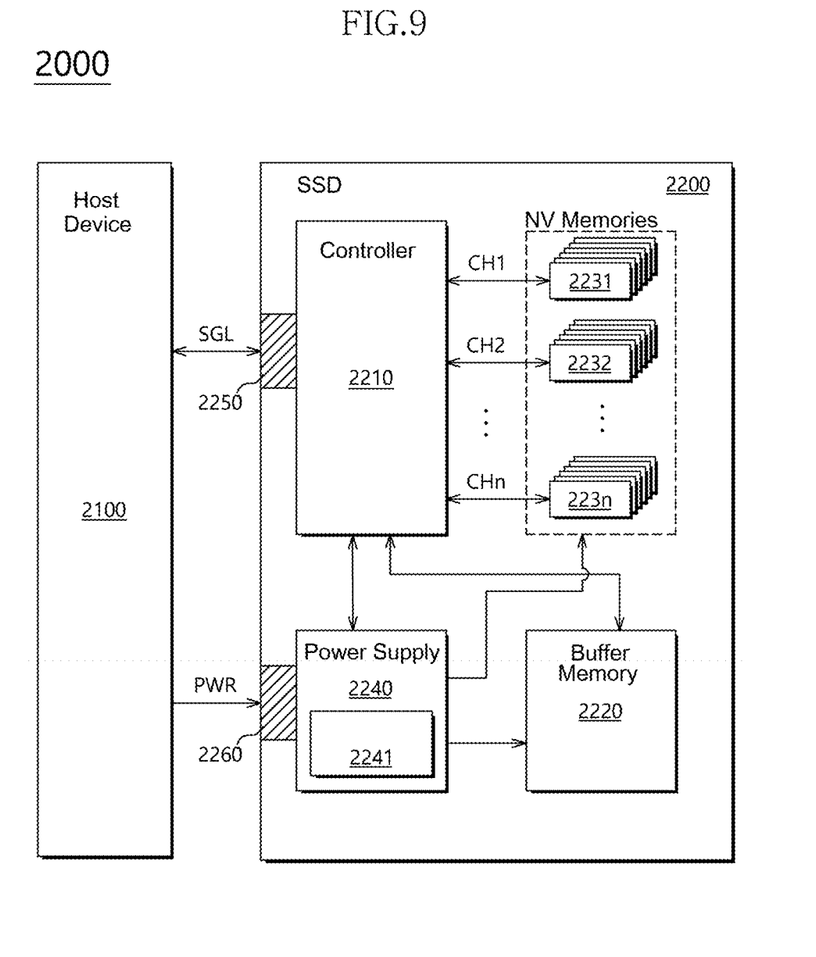
FIG. 9 illustrates a data processing system including an SSD (Solid State Drive) in accordance with an embodiment.

FIG. 9 is a diagram illustrating a data processing system 2000 including a solid state drive (SSD) 2200 in accordance with an embodiment. Referring to FIG. 9, the data processing system 2000 may include a host device 2100 and an SSD 2200.

The SSD 2200 may include a controller 2210, a buffer memory device 2220, nonvolatile memory apparatuses 2231 to 223n, a power supply 2240, a signal connector 2250 and a power connector 2260.

The controller 2210 may control overall operations of the SSD 2200. The controller 2210 may include an embodiment, such as the controller 200 of FIG. 2.

The buffer memory device 2220 may temporarily store data to be stored in the nonvolatile memory apparatuses 2231 to 223n. The buffer memory device 2220 may temporarily store data read from the nonvolatile memory apparatuses 2231 to 223n. The data temporarily stored in the buffer memory device 2220 may be transmitted to the host device 2100 or the nonvolatile memory apparatuses 2231 to 223n under control of the controller 2210.

The nonvolatile memory apparatuses 2231 to 223n may be used as storage media of the SSD 2200. The nonvolatile memory apparatuses 2231 to 223n may be coupled to the controller 2210 through a plurality of channels CH1 to CHn, respectively. One channel may be coupled one or more nonvolatile memory apparatuses. The nonvolatile memory apparatuses coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to normally shut down the SSD 2200, when a sudden power off occurs. The auxiliary power supply 2241 may include large capacitors capable of storing the power PWR.

The controller 2210 may exchange signals SGL with the host device 2100 through the signal connector 2250. The signal SGL may include a command, an address, data and the like. The signal connector 2250 may be configured as various types of connectors depending on the interface between the host device 2100 and the SSD 2200.

Figure 10:
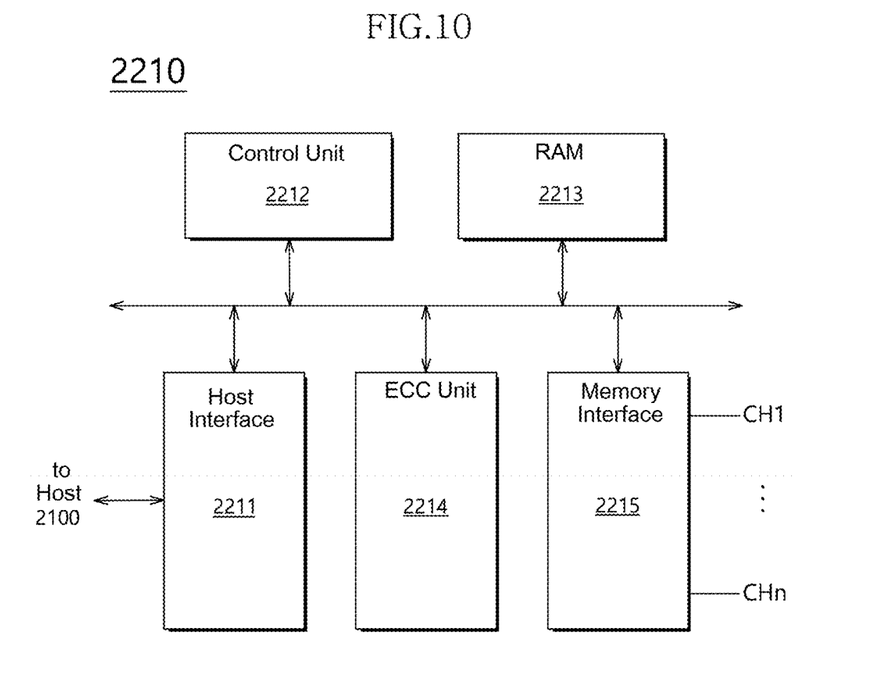
FIG. 10 illustrates a configuration of a controller of FIG. 9.

FIG. 10 is a diagram illustrating a configuration of the controller of FIG. 9. Referring to FIG. 10, the controller 2210 may include a host interface unit 2211, a control unit 2212, a RAM 2213, an ECC unit 2214 and a memory interface unit 2215.

The host interface unit 2211 may interface the host device 2100 and the SSD 2200 according to a protocol of the host device 2100. For example, the host interface unit 2211 may communicate with the host device 2100 through any one of protocols such as SD (Secure Digital), USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage). The host interface unit 2211 may perform a disk emulation function for supporting the host device 2100 to recognize the SSD 2200 as a general-purpose data storage device, for example, an HDD (Hard Disk Drive).

The control unit 2212 may analyze and process a signal received from the host device 2100. The control unit 2212 may control operations of the internal function blocks according to firmware or software for operating the SSD 2200. The RAM 2213 may be used as a working memory for executing such firmware or software.

The ECC unit 2214 may generate parity data of data to be transmitted to the nonvolatile memory apparatuses 2231 to 223n. The generated parity data may be stored in the nonvolatile memory apparatuses 2231 to 223n with the data. The ECC unit 2214 may detect errors in data read from the nonvolatile memory apparatuses 2231 to 223n, based on the parity data. When the detected error falls within a correctable range, the ECC unit 2214 may correct the detected error.

The memory interface unit 2215 may provide a control signal such as a command and address to the nonvolatile memory apparatuses 2231 to 223n shown in FIG. 9, under control of the control unit 2212. The memory interface unit 2215 may exchange data with the nonvolatile memory apparatuses 2231 to 223n, under control of the control unit 2212. For example, the memory interface unit 2215 may provide data stored in the buffer memory device 2220 to the nonvolatile memory apparatuses 2231 to 223n, or provide data read from the nonvolatile memory apparatuses 2231 to 223n to the buffer memory device 2220.

Figure 11:
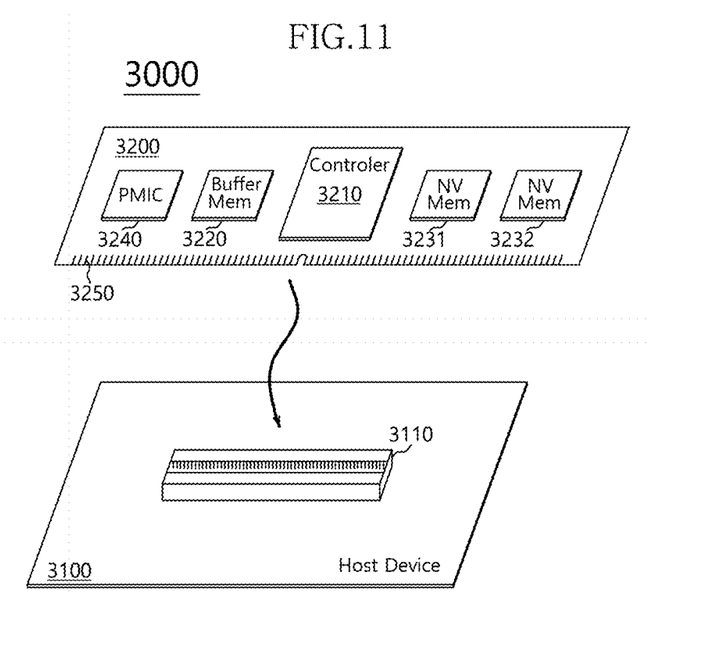
FIG. 11 illustrates a data processing system including a data storage device in accordance with an embodiment.

FIG. 11 is a diagram illustrating a data processing system including a data storage device in accordance with an embodiment. Referring to FIG. 11, the data processing system 3000 may include a host device 3100 and a data storage device 3200.

The host device 3100 may be configured in the form of a board such as a printed circuit board. Although not illustrated, the host device 3100 may include internal function blocks for performing the function of the host device.

The host device 3100 may include a connection terminal 3110 such as a socket, slot or connector. The data storage device 3200 may be mounted on or in the connection terminal 3110.

The data storage device 3200 may be configured in the form of a board such as a printed circuit board. The data storage device 3200 may be referred to as a memory module or memory card. The data storage device 3200 may include a controller 3210, a buffer memory device 3220, nonvolatile memory apparatuses 3231 and 3232, a PMIC (Power Management Integrated Circuit) 3240 and a connection terminal 3250.

The controller 3210 may control overall operations of the data storage device 3200. The controller 3210 may be configured in the same manner as the controller 2210 illustrated in FIG. 10.

The buffer memory device 3220 may temporarily store data to be stored in the nonvolatile memory apparatuses 3231 and 3232. The buffer memory device 3220 may temporarily store data read from the nonvolatile memory apparatuses 3231 and 3232. The data temporarily stored in the buffer memory device 3220 may be transmitted to the host device 3100 or the nonvolatile memory apparatuses 3231 and 3232 under control of the controller 3210.

The nonvolatile memory apparatuses 3231 and 3232 may be used as storage media of the data storage device 3200.

The PMIC 3240 may provide power inputted through the connection terminal 3250 into the data storage device 3200. The PMIC 3240 may manage power of the data storage device 3200 under control of the controller 3210.

The connection terminal 3250 may be connected to the connection terminal 3110 of the host device 3100. Through the connection terminal 3250, power and signals such as commands, addresses and data may be transferred between the host device 3100 and the data storage device 3200. The connection terminal 3250 may be configured in various manners depending on the interface method between the host device 3100 and the data storage device 3200. The connection terminal 3250 may be disposed on any one side of the data storage device 3200.

Figure 12:
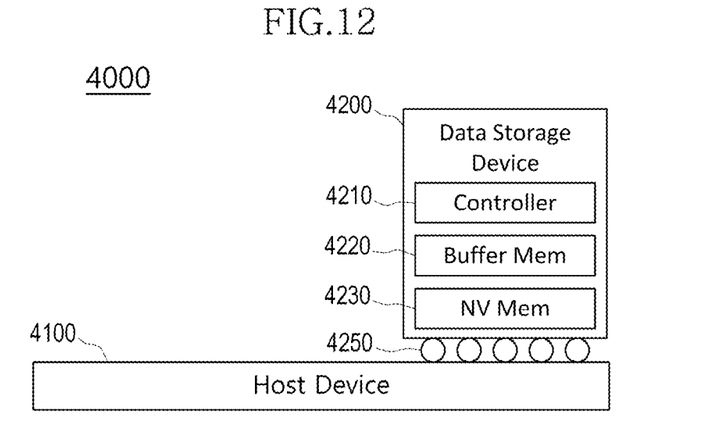
FIG. 12 illustrates a data processing system including a data storage device in accordance with an embodiment.

FIG. 12 is a diagram illustrating a data processing system including a data storage device in accordance with an embodiment. Referring to FIG. 12, the data processing system 4000 may include a host device 4100 and a data storage device 4200.

The host device 4100 may be configured in the form of a board such as a printed circuit board. Although not illustrated, the host device 4100 may include internal function blocks for performing the function of the host device.

The data storage device 4200 may be configured in the form of a surface mount package. The data storage device 4200 may be mounted on the host device 4100 through solder balls 4250. The data storage device 4200 may include a controller 4210, a buffer memory device 4220 and a nonvolatile memory apparatus 4230.

The controller 4210 may control overall operations of the data storage device 4200. The controller 4210 may be configured in the same manner as the controller 2210 illustrated in FIG. 10.

The buffer memory device 4220 may temporarily store data to be stored in the nonvolatile memory apparatus 4230. The buffer memory device 4220 may temporarily store data read from the nonvolatile memory apparatus 4230. The data temporarily stored in the buffer memory device 4220 may be transmitted to the host device 4100 or the nonvolatile memory apparatus 4230 under control of the controller 4210.

The nonvolatile memory apparatus 4230 may be used as a storage medium of the data storage device 4200.

Figure 13:
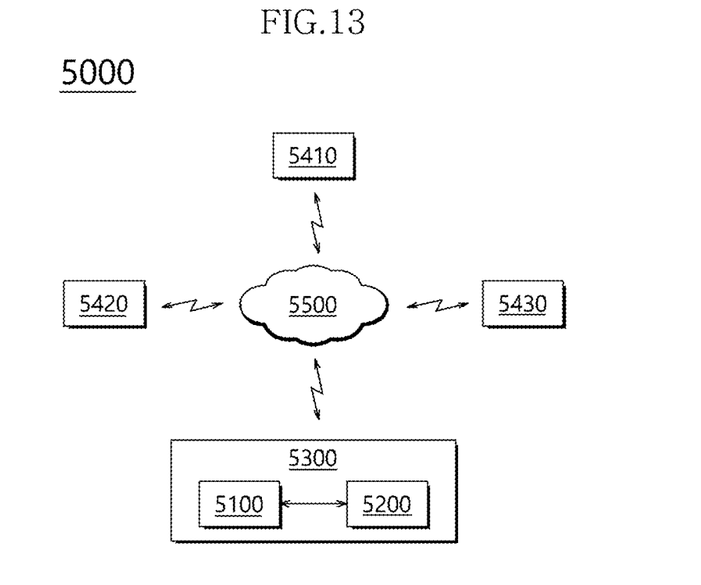
FIG. 13 illustrates a network system including a data storage device in accordance with an embodiment.

FIG. 13 is a diagram illustrating a network system 5000 including a data storage device in accordance with an embodiment. Referring to FIG. 13, the network system 5000 may include a server system 5300 and a plurality of client systems 5410 to 5430 which are coupled through a network 5500.

The server system 5300 may service data in response to requests of the plurality of client systems 5410 to 5430. For example, the server system 5300 may store data provided from the plurality of client systems 5410 to 5430. For another example, the server system 5300 may provide data to the plurality of client systems 5410 to 5430.

The server system 5300 may include a host device 5100 and a data storage device 5200. The data storage device 5200 may be configured as one or more of the data storage device 10 of FIG. 1, the SSD 2200 of FIG. 9, the data storage device 3200 of FIG. 11, the data storage device 4200 of FIG. 12, or combinations thereof.

FIG. 14 is a block diagram illustrating a nonvolatile memory apparatus included in a data storage device in accordance with an embodiment. Referring to FIG. 14, the nonvolatile memory apparatus 300 may include a memory cell array 310, a row decoder 320, a column decoder 330, a data read/write block 340, a voltage generator 350 and a control logic 360.

The memory cell array 310 may include memory cells MC arranged at the respective intersections between word lines WL1 to WLm and bit lines BL1 to BLn.

The row decoder 320 may be coupled to the memory cell array 310 through the word lines WL1 to WLm. The row decoder 320 may operate under control of the control logic 360. The row decoder 320 may decode an address provided from an external device (not illustrated). The row decoder 320 may select and drive the word lines WL1 to WLm based on the decoding result. For example, the row decoder 320 may provide the word lines WL1 to WLm with a word line voltage provided from the voltage generator 350.

The data read/write block 340 may be coupled to the memory cell array 310 through the bit lines BL1 to BLn. The data read/write block 340 may include read/write circuits RW1 to RWn corresponding to the respective bit lines BL1 to BLn. The data read/write block 340 may operate under control of the control logic 360. The data read/write block 340 may operate as a write driver or a sense amplifier, depending on operation modes. For example, the data read/write block 340 may operate as a write driver for storing data, provided from the external device, in the memory cell array 310 during a write operation. For another example, the data read/write block 340 may operate as a sense amplifier for reading data from the memory cell array 310 during a read operation.

The column decoder 330 may operate under control of the control logic 360. The column decoder 330 may decode an address provided from the external device. The column decoder 330 may couple the read/write circuits RW1 to RWn of the data read/write block 340, corresponding to the respective bit lines BL1 to BLn, to a data input/output line (or data input/output buffer), based on the decoding result.

The voltage generator 350 may generate a voltage used for an internal operation of the nonvolatile memory apparatus 300. The voltages generated by the voltage generator 350 may be applied to the memory cells of the memory cell array 310. For example, a program voltage generated during a program operation may be applied to a word line of memory cells on which the program operation is to be performed. For another example, an erase voltage generated during an erase operation may be applied to well regions of memory cells on which the erase operation is to be performed. For still another example, a read voltage generated during a read operation may be applied to a word line of memory cells on which the read operation is to be performed.

The control logic 360 may control overall operations of the nonvolatile memory apparatus 300 based on a control signal provided from the external device. For example, the control logic 360 may control operations of the nonvolatile memory apparatus 300, such as read, write and erase operations of the nonvolatile memory apparatus 300.

While various embodiments have been described above, it will be understood to those skilled in the art that the embodiments described are examples only. Accordingly, the operating process of a data storage device described herein should not be limited based on the described embodiments.

What is claimed is:

1. A data storage device comprising:
a nonvolatile memory apparatus; and
a controller configured to:
  receive a host command including a logical address,
  determine a physical address corresponding to the logical address,
  generate a pre-command including the physical address,
  transmit the generated pre-command to the nonvolatile memory apparatus before completing performance of one or more remaining operations used to process the host command, and
  transmit a confirm command to the nonvolatile memory apparatus when performance of the remaining operations is complete,
wherein the controller performs the remaining operations and the transmission of the generated pre-command to the nonvolatile memory apparatus at the same time.

2. The data storage device according to claim 1, wherein the controller comprises:
a memory configured to store an L2P (Logical-to-Physical) map table including the logical address and the physical address corresponding to the logical address;
a first core configured to translate the logical address into the physical address when the host command is received from the host device, transfer a pre-command packet including the translated physical address to a second core, and perform the remaining operations after transmitting the pre-command packet; and
a second core configured to generate the pre-command according based on the pre-command packet and according to a specification of the host command, transmit the pre-command to the nonvolatile memory apparatus, generate the confirm command based on a post-command packet transferred from the first core after the performance of the remaining operations is complete, and transmit the generated confirm command to the nonvolatile memory apparatus.

3. The data storage device according to claim 2, wherein the second core stores information on a ready or busy status of the nonvolatile memory apparatus, and transmits the pre-command or the confirm command when the nonvolatile memory apparatus is in the ready status.

4. The data storage device according to claim 2, wherein the second core manages a transmission status of the pre-command with respect to the nonvolatile memory apparatus, the transmission status being any one of transmission start, transmission finish, and transmission preparation, and
wherein the second core checks whether the pre-command has been transmitted, based on the transmission status, before transmitting the confirm command to the nonvolatile memory apparatus, and determines whether to transmit the pre-command when transmitting the confirm command.

5. The data storage device according to claim 2, wherein in response to the controller receiving a host abort command before the post-command packet has been transmitted to the second core, the first core aborts a procedure of transmitting the post-command packet to the second core.

6. The data storage device according to claim 2, wherein in response to the controller receiving a host abort command before the post-command packet has been transmitted to the second core, the first core transmits a post-command packet including an abort request to the second core,
wherein in response to receiving the post-command packet including the abort request, the second core aborts transmitting the pre-command to the nonvolatile memory apparatus.

7. The data storage device according to claim 2, wherein when in response to the second core receiving the post-command packet from the first core while the second core is transmitting the pre-command to the nonvolatile memory apparatus, the second core waits until the pre-command is completely transmitted, and then transmits the confirm command to the nonvolatile memory apparatus.

8. The data storage device according to claim 1, wherein when the host command is a read command, the controller generates the pre-command packet including a data storage method, a flash read command indication, and address information.

9. The data storage device according to claim 1, wherein when the host command is a write command, the controller generates the pre-command packet including a data storage method, flash write command indication, address information, and data to be written, or generates the pre-command packet including a data storage method, the flash write command indication, and address information.

10. An operating method of a data storage device, the method comprising:
receiving a host command including a logical address;
determining a physical address corresponding to the logical address;
generating, according to a specification of the host command, a pre-command which includes the physical address;
transmitting the pre-command to the nonvolatile memory apparatus before completing one or more remaining operations used to process the host command;
performing the remaining operations; and
transmitting a confirm command to the nonvolatile memory apparatus when performing the remaining operations is complete,
wherein performance of the remaining operations and transmission of the pre-command to the nonvolatile memory apparatus occur at a same time.

11. The operating method according to claim 10, wherein when the nonvolatile memory apparatus is in a ready status, the pre-command or the confirm command is transmitted to the nonvolatile memory apparatus.

12. The operating method according to claim 10, further comprising managing a transmission status of the pre-command with respect to the nonvolatile memory apparatus, the transmission status being any one of transmission start, transmission finish, and transmission preparation.

13. The operating method according to claim 10, further comprising:
generating a post-command packet in response to completion of the remaining operations;

generating the confirm command according to the post-command packet; and when transmission of the pre-command has not completed and the post-command packet has been generated:
- waiting for transmission of the pre-command to complete, and
- transmitting the confirm command to the nonvolatile memory apparatus in response to the completion of the transmission of the pre-command.

14. The operating method according to claim 10, wherein when the host command is a read command, generating the pre-command packet comprises generating the pre-command packet including a data storage method, a flash read command indication, and address information.

15. The operating method according to claim 10, wherein when the host command is a write command, generating the pre-command packet comprises:

generating the pre-command packet including a data storage method, a flash write command indication, address information, and data to be written; or generating the pre-command packet including a data storage method, the flash write command indication, and address information.

16. The operating method according to claim 10, wherein when the host command is a read command, determining the physical address corresponding to the logical address comprises translating the logical address into the physical address by referring to a previously-stored Logical-to-Physical (L2P) map table.

17. The operating method according to claim 10, wherein when the host command is a write command, determining the physical address corresponding to the logical address comprises setting a physical address to which data corresponding to the logical address is to be written.

* * * * *